United States Patent
Gaudiau et al.

(10) Patent No.: US 11,168,819 B2
(45) Date of Patent: Nov. 9, 2021

(54) DEVICE FOR COUPLING A FLUID PIPE AND A MALE COUPLING, AND ASSEMBLY COMPRISING SUCH A DEVICE AND SAID ASSOCIATED MALE COUPLING

(71) Applicant: TRISTONE FLOWTECH SOLUTIONS (TFS), Carquefou (FR)

(72) Inventors: Ghislain Gaudiau, Ancenis (FR); Francois Le Briquer, Nantes (FR)

(73) Assignee: TRISTONE FLOWTECH SOLUTIONS (TFS), Carquefou (FR)

( * ) Notice: Subject to any disclaimer, the term of this patent is extended or adjusted under 35 U.S.C. 154(b) by 260 days.

(21) Appl. No.: 16/466,540

(22) PCT Filed: Nov. 30, 2017

(86) PCT No.: PCT/FR2017/053299
§ 371 (c)(1),
(2) Date: Jun. 4, 2019

(87) PCT Pub. No.: WO2018/104616
PCT Pub. Date: Jun. 14, 2018

(65) Prior Publication Data
US 2020/0072399 A1  Mar. 5, 2020

(30) Foreign Application Priority Data
Dec. 7, 2016  (FR) .................................... 16 62047

(51) Int. Cl.
*F16L 37/088*  (2006.01)
*F16L 37/14*  (2006.01)

(52) U.S. Cl.
CPC ......... *F16L 37/0885* (2019.08); *F16L 37/144* (2013.01)

(58) Field of Classification Search
CPC . F16L 37/0841; F16L 37/088; F16L 37/0885; F16L 37/12; F16L 37/1225;
(Continued)

(56) References Cited

U.S. PATENT DOCUMENTS

| 2010/0276924 A1* | 11/2010 | Gillet | F16L 37/144 285/93 |
| 2011/0148107 A1* | 6/2011 | Blivet | F16L 37/252 285/402 |

(Continued)

FOREIGN PATENT DOCUMENTS

WO  2011/108728  9/2011

*Primary Examiner* — Aaron M Dunwoody
(74) *Attorney, Agent, or Firm* — Ipsilon USA, LLP

(57) ABSTRACT

A coupling device is provided having a female coupling engageable with a male coupling and a ring interposable between the couplings and provided with retaining means. A gasket is housed in the female coupling and held in position by the ring. The retaining means axially holds the ring to the female coupling and has two windows spaced apart in the circumferential direction over the body of the ring. The complementary retaining means of the female coupling has two lugs projecting from the tubular body constituting the female coupling. Each window houses an elastically deformable tongue having its free end co-operating with a longitudinal edge of the window to provide a housing within which one of the lugs becomes inserted in the engaged state of the female coupling and of the ring, and the retaining means holds the ring to the male coupling having two through openings arranged in the body of the ring and a locking member.

9 Claims, 5 Drawing Sheets

(58) Field of Classification Search
CPC ....... F16L 37/14; F16L 37/142; F16L 37/144; F16L 37/24; F16L 37/244; F16L 37/248; F16L 37/252
USPC .................................................... 285/91, 81
See application file for complete search history.

(56)     References Cited

U.S. PATENT DOCUMENTS

| | | | |
|---|---|---|---|
| 2012/0146326 A1* | 6/2012 | Williams | F16L 37/252 |
| | | | 285/314 |
| 2013/0009393 A1 | 1/2013 | Harald et al. | |
| 2013/0082459 A1* | 4/2013 | Kaneko | F16L 37/144 |
| | | | 285/93 |
| 2013/0140808 A1 | 6/2013 | Hutchinson | |

* cited by examiner

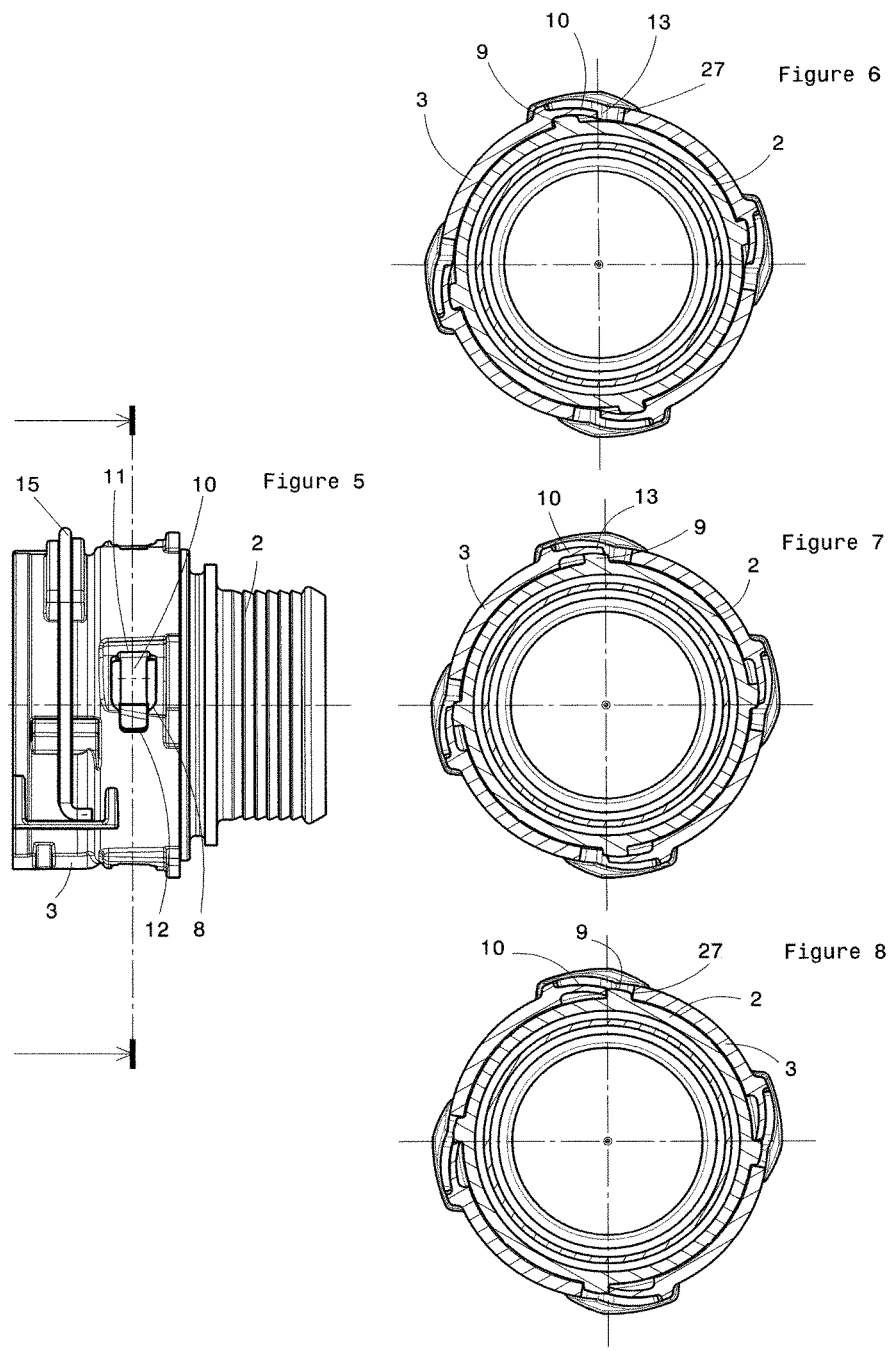

ND A MALE COUPLING, AND ASSEMBLY
DEVICE FOR COUPLING A FLUID PIPE AND A MALE COUPLING, AND ASSEMBLY COMPRISING SUCH A DEVICE AND SAID ASSOCIATED MALE COUPLING

RELATED APPLICATION

This application is a National Phase of PCT/FR2017/053299 filed on Nov. 30, 2017, which claims the benefit of priority from French Patent Application Nos. 16 62047, filed on Dec. 7, 2016, the entirety of which are incorporated by reference.

FIELD OF THE INVENTION

The invention relates to a device for coupling a fluid pipe to a male coupling, and to an assembly comprising such a device and said associated male coupling.

The invention relates more particularly to a device for coupling a fluid pipe, in particular for a motor vehicle, to a male coupling provided with at least one external peripheral groove, the device comprising a female coupling made in the form of a tubular part suitable for engaging with said male coupling, a ring suitable for interposing between said couplings prior to axially engaging said couplings with each other, and at least one circular sealing gasket received inside the female coupling and held axially in position by means of the ring, said ring being suitable for being held and engageably assembled with the couplings by axial retaining means suitable for co-operating with complementary retaining means carried by said couplings in order to lock said engagement, the axial retaining means for axially holding the ring to the female coupling being made integrally with the ring.

PRIOR ART

Such sealed coupling devices for fluid pipes are well known to those skilled in this art. Nevertheless, solutions are being sought nowadays for producing them at lower cost and without degrading the effectiveness of the sealing and the modular nature of the device.

OBJECT AND SUMMARY

An object of the invention is to propose a device of the above-specified type and of a design that enables the female coupling and the ring of the device to be made out of more rigid material, so as to reduce material costs without harming the effectiveness of the sealing or the modular nature of the device.

For this purpose, the invention provides a device for coupling a fluid pipe to a male coupling provided with at least one external peripheral groove, the device comprising:
 a female coupling made in the form of a tubular part suitable for engaging with said male coupling;
 a ring suitable for interposing between said couplings prior to axially engaging said couplings with each other, and at least one circular sealing gasket received inside the female coupling and held axially in position by means of the ring, said ring being suitable for being held engageably assembled with the couplings by axial retaining means suitable for co-operating with complementary retaining means carried by said couplings in order to lock said engagement, the axial retaining means for axially holding the ring to the female coupling being made integrally with the ring;

the device being characterized in that at least a portion of the axial retaining means of the ring for holding it to the female coupling and the axial retaining means of the ring for holding it to the male coupling are arranged in axially offset manner along the body of the ring, in that the retaining means of the ring for axially holding it to the female coupling comprise at least two windows spaced apart along the circumferential direction over the body of the ring, in that the complementary retaining means of the female coupling comprise at least two lugs projecting radially outwards from the tubular body constituting the female coupling, in that each window of the axial retaining means of the ring for holding it to the female coupling houses an elastically deformable tongue made integrally with the ring and extending circumferentially inside the window from one edge of the window, referred to as the first longitudinal edge, towards the opposite longitudinal edge of the window, referred to as the second longitudinal edge, the free end of the tongue co-operating with the second longitudinal edge of the window to provide a housing within which one of the lugs of the female coupling is suitable for becoming inserted in the engaged state of the female coupling and of the ring, and in that the retaining means of the ring suitable for holding the ring to the male coupling include at least one, and preferably at least two, through openings arranged in the body of the ring and a locking member configured in its state positioned on the ring to project through the through opening(s) of the body of the ring towards the inside of the body of the ring.

Making the device in two portions in the form of a female coupling and of a ring makes it possible, if necessary, to modify the female coupling while conserving the ring. The presence of the ring and of the female coupling enables the gasket to be sandwiched, ensuring good sealing at reduced cost. The use of a locking member enables the device to be used with a large number of types of male coupling. Finally, locking the engagement of the ring and of the female coupling by moving in translation and then turning gives good strength to the engagement, while being suitable for being performed with portions of the parts that are not very deformable, thus allowing the ring and the female coupling to be made of a material that is relatively rigid, thereby reducing the cost of the material for the assembly.

In an embodiment of the invention, the locking member is in the form of a generally U-shaped staple placed astride the openings when in its state positioned on the ring. Such a locking member is thus suitable for acting through the through openings in the body of the ring to press against the male coupling and, preferably, to become inserted in the external peripheral groove of the male coupling. By designing the locking in this way, it becomes possible to make the ring out of a material that is relatively rigid.

In the embodiment in which the retaining means of the ring for holding it to the male coupling comprise at least two through openings arranged in the body of the ring in angularly offset manner, the through openings are preferably spaced apart from each other by an outer peripheral rail forming a guide path for the locking member, the rail being made integrally with the ring.

In an embodiment of the invention, on its inside peripheral surface, beside its face for inserting the female coupling into the ring, the ring is provided with at least two notches, each notch being arranged in axial alignment with one of the windows in the ring and forming an axial guide path within which one of the lugs of the female coupling is suitable for sliding while engaging the female coupling in the ring until reaching a position in which the lug is in bearing contact against the inside face of the tongue located inside said window, the ring and the female coupling being suitable, in said engaged position, for being turned relative to each other to enable the lug to slide along the tongue towards the free end of the tongue until the lug is inserted in the housing provided between the second longitudinal edge of the window and the free end of the tongue, this sliding of the lug along the tongue tending to move the tongue away from its rest position in which said tongue extends inside the window, said tongue, when the lug is in its state inserted in its housing, being returned resiliently towards its rest position in which it prevents any exit of the lug from its housing.

By means of this locking, which acts by axial relative movement, followed by turning movement of the ring and of the female coupling, it becomes possible for the locking to be mechanically strong, while needing little elastic deformation of the ring portions that are stressed.

In an embodiment of the invention, going from its end for connection to the ring towards its opposite end, the female coupling is provided with a succession of at least two internal peripheral shoulders giving the female coupling a staircase-shaped inside profile, the first peripheral shoulder forming a seat for the sealing gasket, the second peripheral shoulder being suitable for forming an axial abutment for the male coupling when said male and female couplings are in the engaged state.

In spite of the gasket being mounted in extremely simple manner, the resulting sealing is sealing of high quality.

In an embodiment of the invention, level with the associated tongue, each window of the ring presents a distance between its transverse edges that is greater than the distance between the transverse edges of the window level with the housing suitable for receiving the lug. In parallel with the tongue being free to move, this results in the lug being wedged axially, since the distance between the transverse edges of the window level with the housing that is suitable for receiving the lug matches the dimensions of said lug.

In an embodiment of the invention, on its inside peripheral surface, beside the face for inserting the male coupling into the ring, the ring is provided with at least one angular abutment made integrally with the ring, said angular abutment being in the form of a male or respectively female member, suitable for co-operating with a complementary female or respectively male member carried by the male coupling to prevent any relative turning between the ring and the male coupling in the engaged state.

In an embodiment of the invention, on its external peripheral surface beside its end opposite from its end for coupling with the ring, the female coupling is provided with serrations. Such serrations enable the female coupling to be fastened with any pipe, merely by engagement.

The invention also provides an assembly comprising a male coupling provided with at least one external peripheral groove, and a device for coupling a fluid pipe to said male coupling, the assembly being characterized in that the device for quick coupling a fluid pipe to said male coupling is of the above-specified type.

BRIEF DESCRIPTION OF THE FIGURES

The invention can be well understood on reading the following description of embodiments, given with reference to the accompanying drawings, in which:

FIG. 5 shows a side view of the device; and

FIGS. 6 to 8 show, in the form of cross section views, the various stages of locking together the ring and the female coupling.

DETAILED DESCRIPTION

Figure 1:
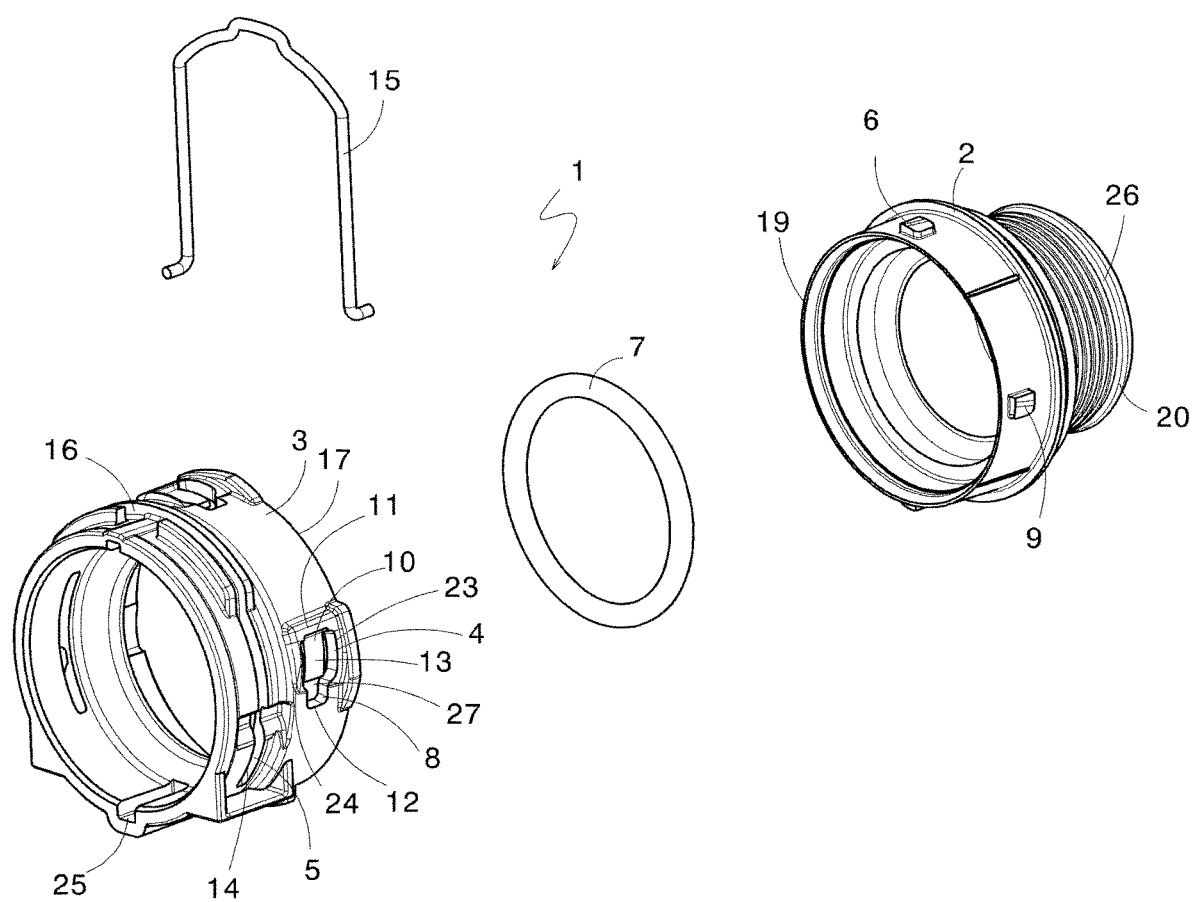
FIG. 1 shows a perspective view of a device in accordance with the invention with its constituent elements in an exploded position.
Figure 2:
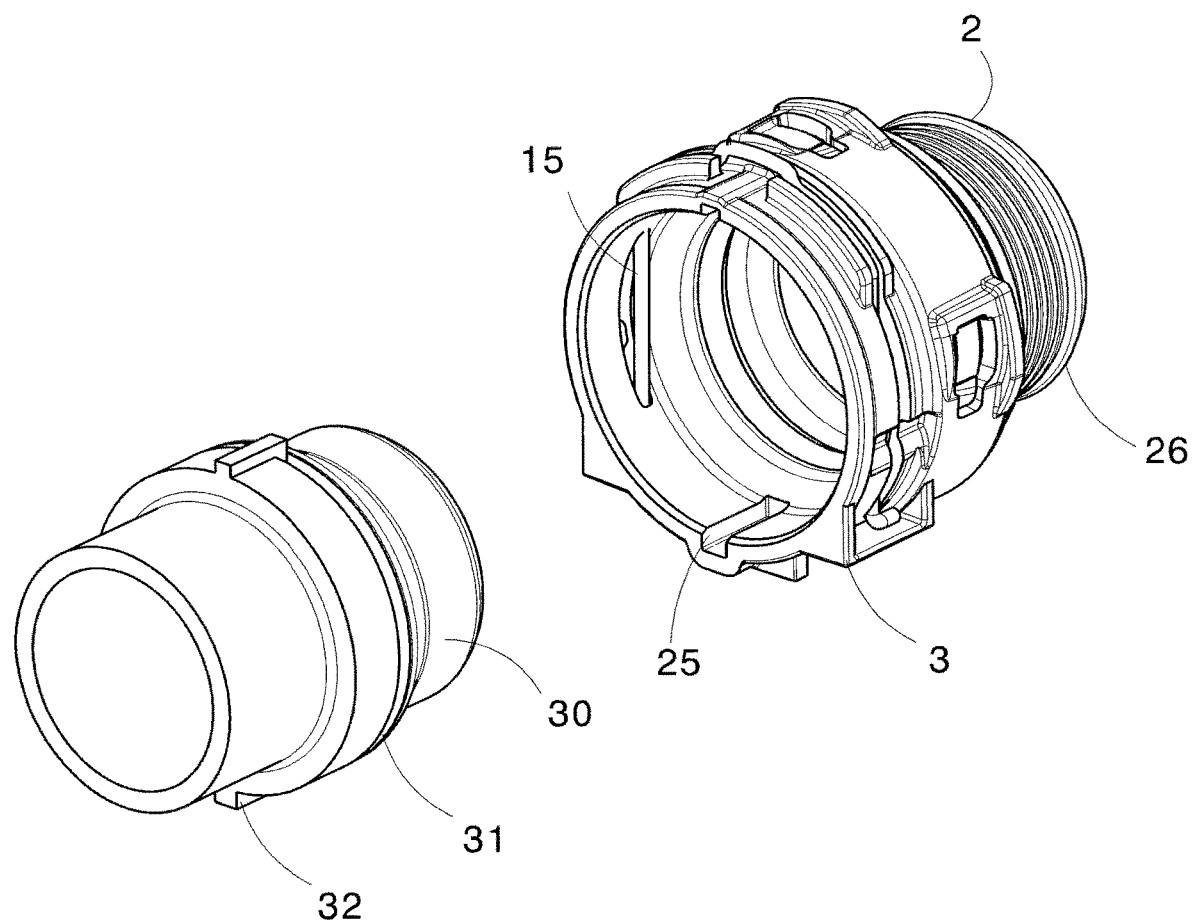
FIG. 2 shows, in perspective and in a non-assembled position, an assembly in accordance with the invention comprising a device in accordance with the invention and a male coupling.
Figure 3:
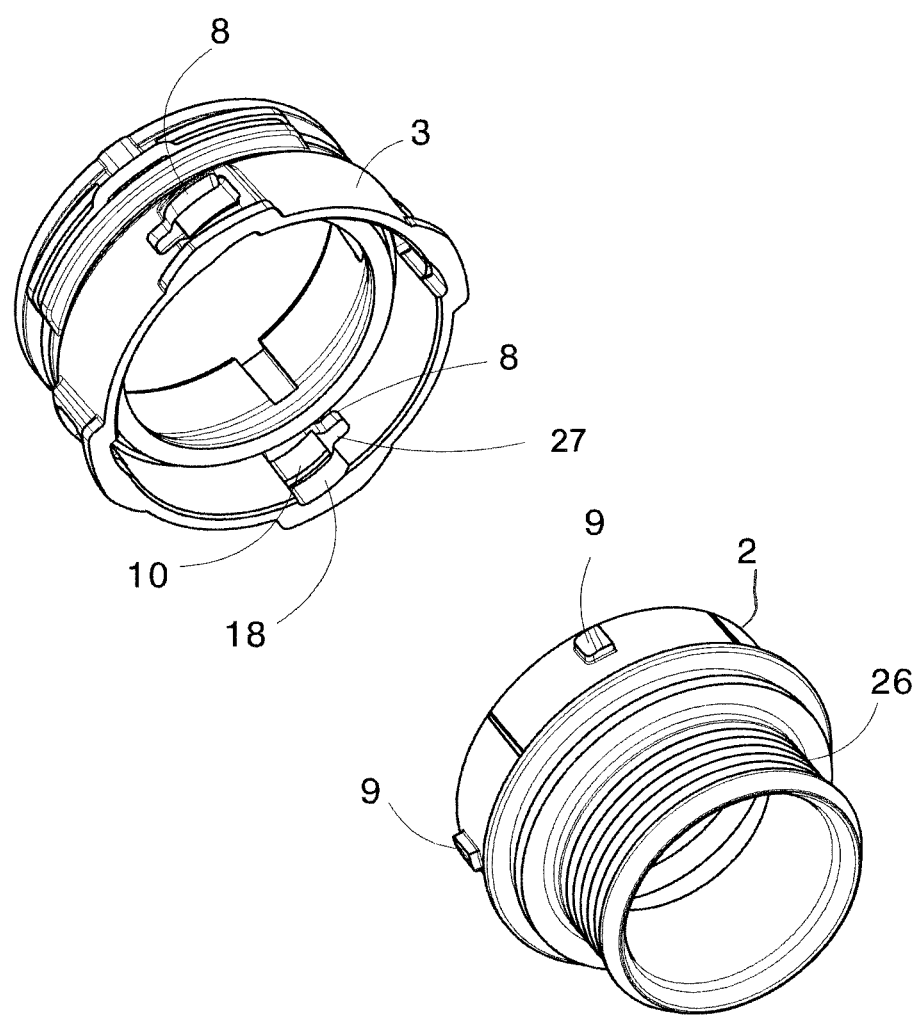
FIG. 3 shows, in perspective and in a non-assembled position, a female coupling and a ring seen from beside the face of the ring for engaging the female coupling.
Figure 4:
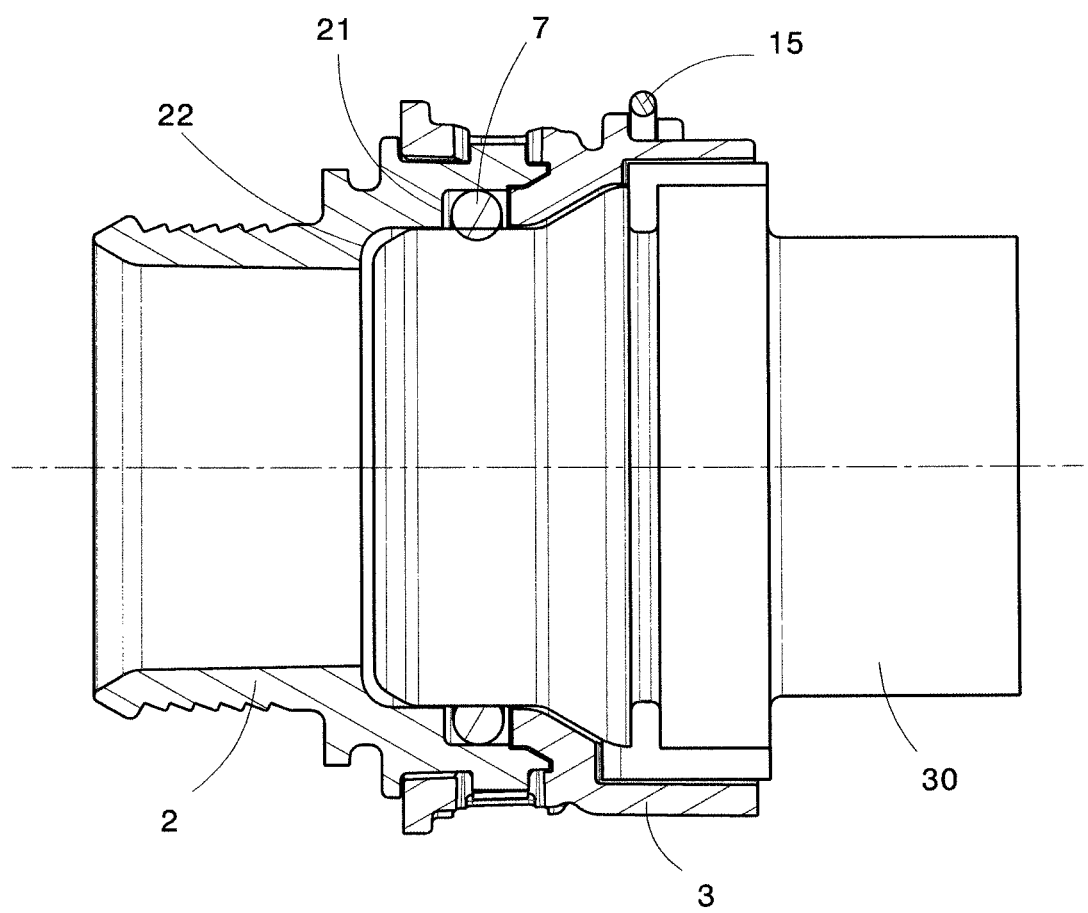
FIG. 4 shows a section view of said assembly with its elements in the assembled state.

As mentioned above, the device 1 of the invention is intended more particularly for enabling so-called "quick" coupling of a fluid pipe (not shown) with a male coupling 30 in order to form an assembly, likewise in accordance with the invention.

The device 1 comprises a female coupling 2 in the form of a tubular body, i.e. an elongate hollow body, that is open at each of its ends. The female coupling 2 is suitable for engageably receiving the male coupling 30.

The device also comprises a ring 3 that is interposed between the female and male couplings 2 and 30 prior to engageably assembling said couplings 2 and 30 together. The ring 3 has axial retaining means 4 suitable for co-operating with complementary retaining means 6 carried by the female coupling 2 in order to hold it in the engageably assembled state with the female coupling 2. The ring 3 is also suitable for being held engageably assembled with the male coupling 30 by using axial retaining means 5 suitable for co-operating with complementary retaining means 31 carried by the male coupling 30 and implemented in this example in the form of an external peripheral groove in the male coupling 30.

In the examples shown, the axial retaining means 4 for holding the ring 3 to the female coupling 2 are made integrally with the ring 3 and comprise at least two, and specifically in this example four, windows 8 that are angularly offset around the body of the ring 3. Each of these four windows 8 is spaced apart in the circumferential direction from an adjacent window 8 by an angle close to 90°.

The complementary retaining means 6 of the female coupling 2 comprise at least two lugs 9, specifically four lugs in this example, projecting radially outwards from the tubular body of the female coupling 2. These lugs 9 are angularly offset, and each of them is spaced apart in the circumferential direction from an adjacent lug 9 by an angle close to 90°.

Each window 8 in the ring 3 houses an elastically deformable tongue 10 made integrally with the ring 3 and extending circumferentially inside the window from an edge of the window 8, referred to as its first longitudinal edge 11, going towards the opposite longitudinal edge of the window 8, referred to as its second longitudinal edge 12. The longitudinal edges of the window 8 thus extend parallel to the longitudinal axis of the ring 3, and the longitudinal axis of the tongue 10 extends transversely relative to the longitudinal axis of the ring 3, and preferably perpendicularly relative thereto.

The free end 13 of the tongue 10 co-operates with the second longitudinal edge 12 of the window 8 to provide a housing 27 into which one of the lugs 9 of the female coupling 2 is suitable for becoming inserted when the female coupling 2 and the ring 3 are in the engaged state.

In order to facilitate inserting each lug 9 into its housing 27, the ring is provided on its inside peripheral surface beside the face 17 for inserting the female coupling 2 into the ring 3 with at least two grooves or notches 18. Specifically, in this example, four notches 18 are shown. Each notch 18 is associated with a respective window 8.

Each notch 18 is arranged in axial alignment with one of the windows 8 of the ring, and it forms an axial guide path within which one of the lugs 9 of the female coupling is suitable for sliding while engaging the female coupling 2 in the ring 3, until reaching a position in which the lug 9 is in bearing contact against the inside face of the tongue 10 arranged inside of the window 8, i.e. its face facing towards the inside of the ring. This position of the lug in bearing contact against the tongue 10 is shown in detail in FIG. 6.

In this engagement position, the ring 3 and the female coupling 2 are suitable for being turned in relative rotation to enable the lug 9 to slide along the tongue 10 towards the free end 13 of the tongue 10 until the lug 9 becomes inserted in the housing 27 provided between the second longitudinal edge of the window 8 and the free end 13 of the tongue 10.

This sliding of the lug 9 along the tongue 10 tends to move the tongue 10 away from its rest position in which the tongue 10 extends inside the window 8. Specifically, the tongue 10 extends in the circumferential direction of the ring 3 from its end connected to the first longitudinal edge of the window 8 towards the free end of the tongue, while tending to come closer to the center of the ring. When the lug 9 is in its state inserted in its housing 27, the tongue 10 is urged resiliently towards the rest position in which it prevents any exit of the lug 9 from its housing 27. Specifically, when the lug 9 is in its inserted state in its housing 27, the tongue 10 is free from any stress from the lug 9, and can thus be returned into the rest position by its own resilient force.

Once more, this deformation of the tongue 10 under the action of the lug 9 until the lug 9 becomes locked by the tongue 10 is shown in detail in FIGS. 7 and 8.

Disassembly for the purpose of separating the ring 3 and the female coupling 2 becomes extremely difficult.

In order to avoid any axial clearance between the ring 3 and the female coupling 2, without interfering with the ability of the tongue to deform, each window 8 of the ring 3 presents, level with the associated tongue 10, a distance between its transverse edges 23 and 24 that is greater than the distance between the transverse edges 23 and 24 of the window 8 level with the housing 27 suitable for receiving the lug 9.

The distance between the transverse edges 23 and 24 of the window 8 level with the housing 27 suitable for receiving the lug 9 is matched to the length of the lug 9 as measured along the longitudinal axis of the ring.

Finally, on its external peripheral surface beside its end opposite from its end 19 for coupling with the ring 3, the female coupling 2 is provided with serrations 26, in this example of the Christmas tree type. The serrations 26 enable the female coupling 2 to be coupled by engagement with any pipe.

The retaining means 5 for holding the ring 3 to the male coupling 30 comprise at least one through opening, and in this example two through openings, provided in the body of the ring 3 together with a locking member 15 suitable for acting through the through openings 14 in the body of the ring 30 so as to bear against the male coupling 30 and become inserted in the external peripheral groove 31 of the male coupling 30.

The through openings 14 are arranged in diametrically opposite manner in the body of the ring 3.

The locking member 15 is in the form of a generally U-shaped staple that is placed astride the openings 14 in the ring 3 when in position on the ring 3, so as to project through the through openings 14 towards the inside of the body of the ring 3 and thus act through the through openings 14 in the body of the ring 3 so as to bear against the male coupling 30 and become inserted in the external peripheral groove 31 of the male coupling 30.

In order to assist in holding the locking member 15 in position on the ring 3, the through openings 14 are spaced apart from each other by an outer peripheral rail 16 forming a guide path for the locking member 15. The rail 16 is made integrally with the ring 3. In this example, the rail comprises two parallel ribs, each extending a longitudinal edge of the opening, the longitudinal edge of the opening extending in the circumferential direction of the ring.

In order to facilitate engageably assembling the male coupling 30 with the ring 3 and prevent any subsequent relative turning between the ring 3 and the male coupling 30 in the engaged state, the inside peripheral surface of the ring 3 beside the face for inserting the male coupling 30 into the ring 3 is provided with at least one angular abutment 25, and specifically in this example with two angular abutments 25, each of which is made integrally with the ring 3.

In this example, the angular abutments 25 are arranged in diametrically opposite manner on the inner peripheral surface of the ring, and each of them is in the form of an axial groove opening out into the face of the ring used for inserting the male coupling 30 into the ring.

Each groove is suitable for co-operating with an axial spline 32 formed on the outer peripheral surface of the male coupling 30, the axial spline 32 extending on each occasion between the end of the male coupling 30 opposite from its end connecting with the ring 3 and the external circumferential groove 31 of the male coupling 30 serving to receive the locking member 15.

Likewise, the through openings 14 of the ring 3 serving to receive the locking member 15 are axially offset from the windows 8 in the ring 3, and they are located between the windows 8 and the face of the ring 3 used for inserting the male coupling 30.

The ring 3 and the male coupling 30 are thus assembled together as follows: the male coupling 30 and the ring 3 are moved towards each other by engaging the male coupling 30 in the ring 3. This approach takes place in such a manner that the spline 32 of the male coupling 30 is in alignment with the groove 25 of the ring 3. Once the ring 3 and the coupling 30 are mutually engaged, the locking member 15 is placed astride the ring 3 level with the through openings 14 in the ring 3, and the branches of the U-shape of the locking member 15 become received through the through openings 14 in the external circumferential groove 31 of the male coupling 30.

In order to make such an assembly leaktight, a circular sealing ring 7, specifically in this example an O-ring, is received inside the female coupling 2 and is held axially in position by means of the ring 3 when the ring 3 and the female coupling 2 are in the engaged state.

For this purpose, going from its end 19 for coupling with the ring 3 towards its opposite end 20 for fastening to a pipe, the female coupling 2 is provided with at least two internal peripheral shoulders 21 and 22, giving the female coupling 2 a staircase-shaped inside profile. The first peripheral shoulder 21 forms a seat for the sealing gasket 7. The second peripheral shoulder 22 is suitable for forming an axial abutment for the male coupling 30 when said male and female couplings 30 and 2 are in the engaged state.

The sealing gasket 7 is thus sandwiched between the inner peripheral shoulder 21 of the female coupling 2 and a facing annular circular internal peripheral surface of the ring 3.

In practice, the sealing gasket 17 is generally put into place in the female coupling 2, and then the ring 3 and the female coupling 2 are pre-assembled prior to being assembled with the male coupling 30.

The invention claimed is:

1. A device for coupling a fluid pipe to a male coupling provided with at least one external peripheral groove, the device comprising:
    a female coupling made in the form of a tubular part suitable for engaging with said male coupling;
    a ring suitable for interposing between said couplings prior to axially engaging said couplings with each other, and at least one circular sealing gasket received inside the female coupling and held axially in position by means of the ring, said ring being suitable for being held engageably assembled with the couplings by axial retaining means suitable for co-operating with complementary retaining means carried by said couplings in order to lock said engagement, the axial retaining means for axially holding the ring to the female coupling being made integrally with the ring;
    wherein at least a portion of the axial retaining means of the ring for holding said ring to the female coupling and the axial retaining means of the ring for holding said ring to the male coupling are arranged in axially offset manner along the body of the ring, in that the retaining means of the ring for axially holding said ring it to the female coupling comprise at least two windows spaced apart along a circumferential direction over the body of the ring, in that a complementary retaining means of the female coupling comprise at least two lugs projecting radially outwards from the tubular body constituting the female coupling, in that each window of the axial retaining means of the ring for holding said ring to the female coupling houses an elastically deformable tongue made integrally with the ring and extending circumferentially inside the window from one edge of the window, referred to as the first longitudinal edge, towards an opposite longitudinal edge of the window, referred to as the second longitudinal edge, a free end of the tongue co-operating with the second longitudinal edge of the window to provide a housing within which one of the lugs of the female coupling is suitable for becoming inserted in the engaged state of the female coupling and of the ring, and in that the retaining means of the ring, suitable for holding the ring to the male coupling, include at least one through openings arranged in the body of the ring and a locking member configured, when positioned on the ring, to project through the through opening(s) of the body of the ring towards the inside of the body of the ring.

2. The device according to claim 1, of the type in which the retaining means of the ring for holding said ring to the male coupling comprise at least two through openings arranged in the body of the ring;
    wherein the locking member is in the form of a generally U-shaped staple placed astride the openings when in its state positioned on the ring.

3. The device according to claim 1, of the type in which the retaining means of the ring for holding said ring to the male coupling comprise at least two through openings arranged in the body of the ring in angularly offset manner;
    wherein the through openings are spaced apart from each other by an outer peripheral rail forming a guide path for the locking member, the rail being made integrally with the ring.

4. The device according to claim 1;
    wherein, on a inside peripheral surface, beside a face for inserting the female coupling into the ring, the ring is provided with at least two notches, each notch being arranged in axial alignment with one of the windows in the ring and forming an axial guide path within which one of the lugs of the female coupling is suitable for sliding while engaging the female coupling in the ring until reaching a position in which the lug is in bearing contact against the inside face of the tongue located inside said window, the ring and the female coupling being suitable, in said engaged position, for being turned relative to each other to enable the lug to slide along the tongue towards the free end of the tongue until the lug is inserted in the housing provided between the second longitudinal edge of the window and the free end of the tongue, this sliding of the lug along the tongue tending to move the tongue away from a rest position in which said tongue extends inside the window, said tongue, when the lug is in a state inserted in the housing, being returned resiliently towards the rest position preventing any exit of the lug from the housing.

5. The device according to claim 1;
    wherein, the female coupling, going from an end for connection to the ring towards an opposite end, is provided with a succession of at least two internal peripheral shoulders giving the female coupling a staircase-shaped inside profile, the first peripheral shoulder forming a seat for the sealing gasket, the second peripheral shoulder being suitable for forming an axial abutment for the male coupling when said male and female couplings are in the engaged state.

6. The device according to claim 1;
    wherein, level with the associated tongue, each window of the ring presents a distance between a transverse edges that is greater than the distance between the transverse edges of the window level with the housing suitable for receiving the lug.

7. The device according to claim 1;
    wherein, an inside peripheral surface of said ring, beside the face for inserting the male coupling into the ring, is provided with at least one angular abutment made integrally with the ring, said angular abutment being in the form of a male or respectively female member, suitable for co-operating with a complementary female or respectively male member carried by the male coupling to prevent any relative turning between the ring and the male coupling in the engaged state.

8. The device according to claim 1;
    wherein, the female coupling, on an external peripheral surface, beside an end opposite from an end for coupling with the ring, is provided with serrations.

9. An assembly comprising a male coupling provided with at least one external peripheral groove, and a device for coupling a fluid pipe to said male coupling;
    wherein the device for quick coupling a fluid pipe to said male coupling is a device in accordance with claim 1.

* * * * *